INVENTOR
Otto Kugler Sr.
By W.W. Williamson Atty.

June 30, 1925.
O. KUGLER, SR
1,544,324
SAFETY CLUTCH CONTROLLER FOR AUTOMOBILES
Filed July 7, 1923
7 Sheets-Sheet 5

INVENTOR
Otto Kugler Sr.
By W. W. Williamson
Atty.

June 30, 1925.　　　　　　　　　　　　　　　　　　1,544,324
O. KUGLER, SR
SAFETY CLUTCH CONTROLLER FOR AUTOMOBILES
Filed July 7, 1923　　　　　7 Sheets-Sheet 6
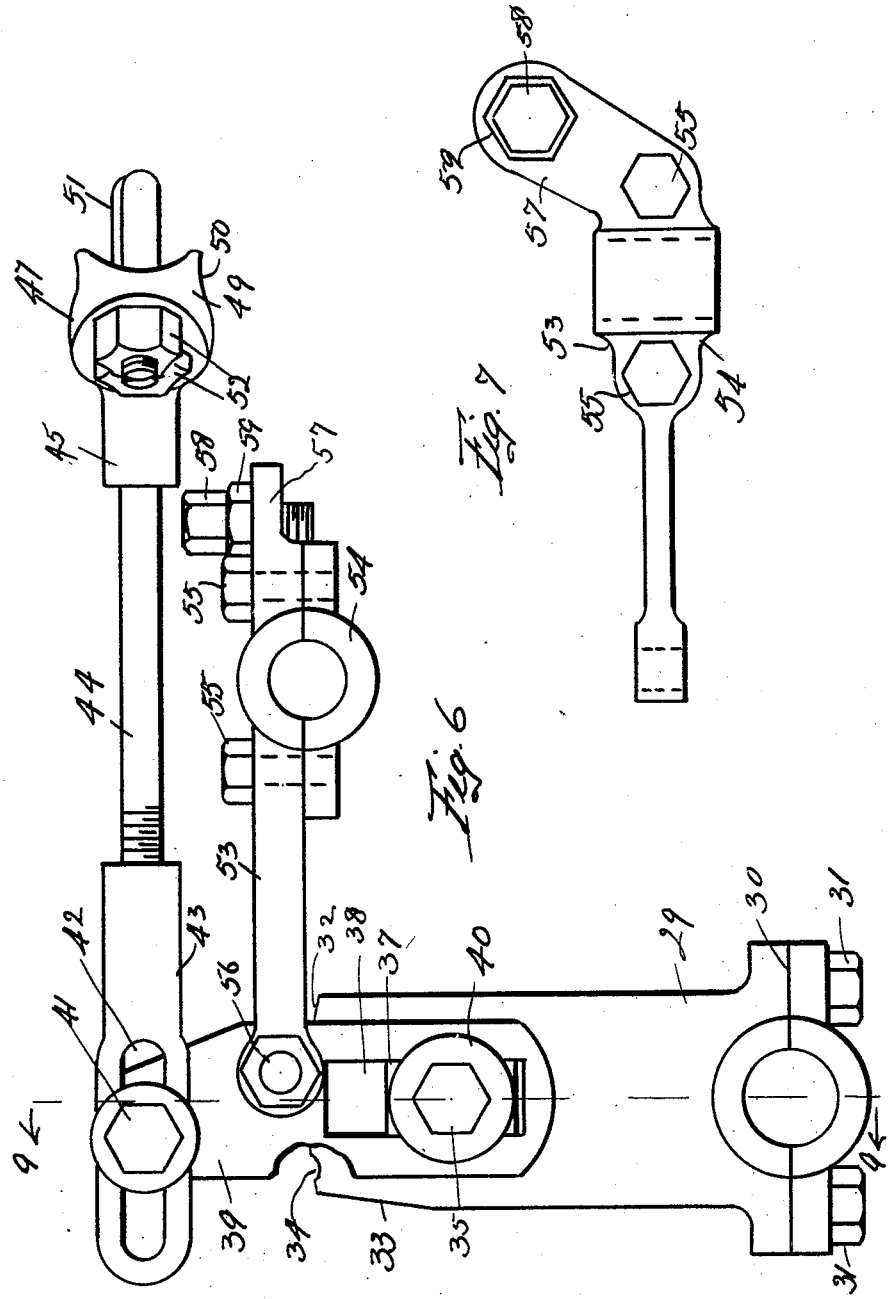
INVENTOR
Otto Kugler Sr.
By W. W. Williamson
Atty.

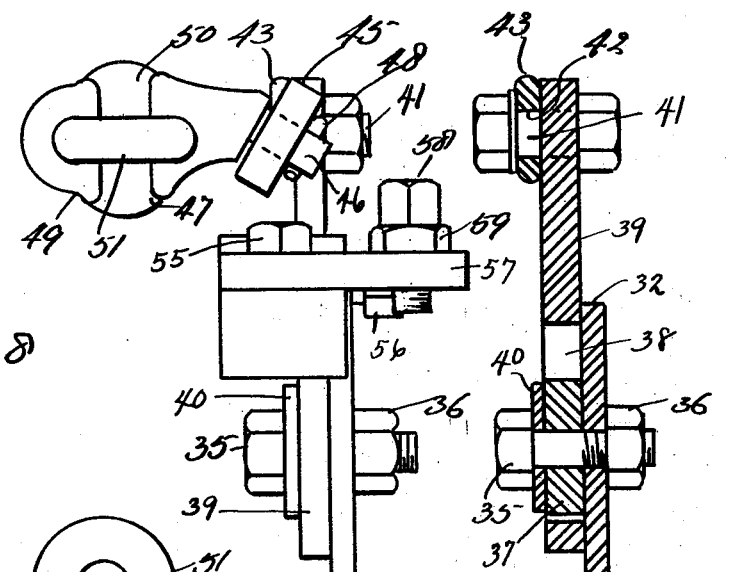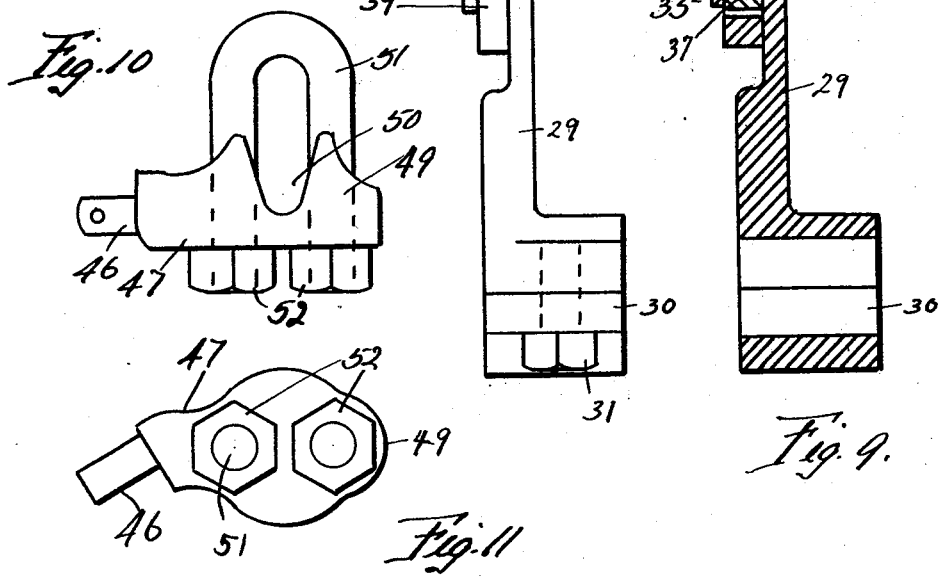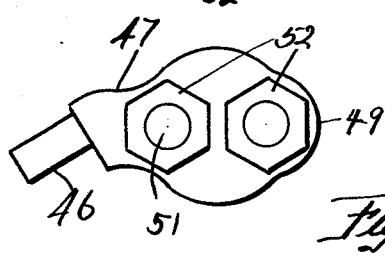

Patented June 30, 1925.

1,544,324

UNITED STATES PATENT OFFICE.

OTTO KUGLER, SR., OF PHILADELPHIA, PENNSYLVANIA.

SAFETY CLUTCH CONTROLLER FOR AUTOMOBILES.

Application filed July 7, 1923. Serial No. 650,007.

*To all whom it may concern:*

Be it known that I, OTTO KUGLER, Sr., a citizen of the United States, residing at Philadelphia, in the county of Philadelphia and State of Pennsylvania, have invented new and useful Improvements in a Safety Clutch Controller for Automobiles, of which the following is a specification.

My invention relates to new and useful improvements in a safety clutch controller for automobiles, and has for its primary object to provide means for connecting a clutch mechanism with a brake operating mechanism of an automobile whereby the operations of the brake mechanism will actuate a controlling clutch mechanism.

Another object of the invention is to indirectly connect the clutch mechanism with a brake operating mechanism such as a brake pedal whereby the movements of the brake pedal will be transmitted to the clutch mechanism in order that the clutch may be "thrown out" or moved to a neutral position upon the complete application of the braking action.

This device although possibly not limited to is particularly adapted for use with an automobile of the "Ford" type wherein the transmission is of planetary design, such movement including a brake mechanism actuated by one pedal, high and low speed mechanisms both actuated by a single clutch pedal and a reverse mechanism actuated by a third or reverse pedal. With such mechanisms it is necessary to use one foot to release the clutch and another to apply the brake or to take one hand from the steering wheel for actuation of the control lever to operate the emergency brakes. The application of the brakes without releasing the clutch will cause the engine to stop thus preventing restarting of the automobile in case of an emergency. Ofttimes during excitement when danger confronts a driver unexpectedly such driver instinctively applies the brake without first releasing the clutch and this stalls the engine. This sudden stopping of the automobile may cause other dangers to arise which might be overcome were it possible to immediately proceed or reverse.

These disadvantages are entirely overcome by the use of my invention since upon the application of the foot brake the clutch is simultaneously disengaged thus freeing the engine so as to allow it to continue running and if the necessity arises the automobile may be immediately started forward in low gear or reversed as the case may be.

Another advantage of my invention is that the clutch may be released upon a short movement of the brake pedal but which movement is insufficient to move the parts of the mechanism to such a position that they cannot be returned until reset by operation of the clutch pedal thereby allowing the automobile to coast, as when rounding corners, and to permit the high speed mechanism to be immediately re-engaged without having to first go into low speed.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figure 5:
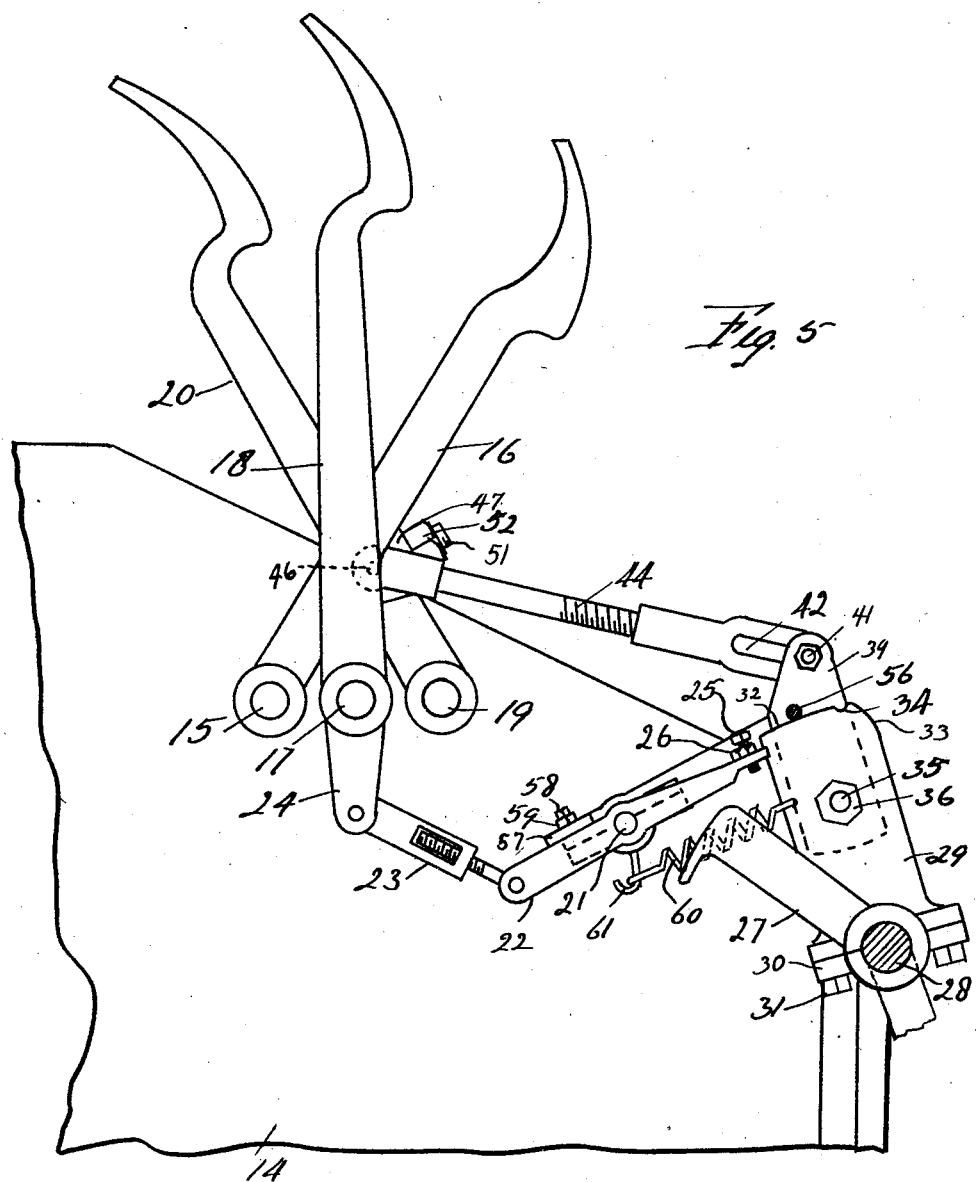

Fig. 5, likewise is a similar view showing the brake pedal and component parts in the positions assumed when the brake is applied.

Fig. 6, is an enlarged side elevation of the complete clutch controller per se looking at the side opposite that shown in Figs. 1 to 5 inclusive.

Fig. 7, is a plan view of the supplementary or secondary clutch lever.

Fig 8, is an end or edge view of the controller.

Fig. 9, is a section at the line 9—9 of Fig. 6.

Fig. 10, is a plan view of the brake pedal connection.

Fig. 11, is a face view of the same.

In carrying out my invention as herein embodied, 14 conventionally represents an automobile transmission including a reverse pedal shaft 15 with a reverse pedal 16 fixed thereto, a slow speed shaft 17 with a clutch pedal 18 fixed thereto, a brake pedal shaft 19 with a brake pedal 20 fixed thereto and a clutch lever shaft 21 with a clutch lever 22 fixed thereto. To one end of the clutch lever 22 is attached a suitable connection 23 which is also attached to the free end of the pendant 24 forming a part of the clutch pedal 18. The other end of the clutch lever 22 carries an adjusting screw 25 which is held in different positions by a check nut 26. This adjusting screw coacts with the speed lever 27 fixed to the ordinary controller shaft 28 which latter actuates the emergency brakes. The parts so far referred to relate to the well known "Ford" transmission of the planetary type and therefore have not been described in detail.

On the controller shaft 28 is loosely journalled a cam plate 29 having a split bearing 30 the parts of which are held in place by suitable fastening devices 31 such as stud bolts. At the outer or free end is formed an arcuate surface 32 from one end of which leads an oblique surface 33 at an angle to the longitudinal center of the cam plate. The free end of said cam plate has a notch 34 therein adjacent the inclined edge 33.

The cam plate 29 carries a headed trunnion 35 which as here shown may be in the form of a bolt having threaded connection with the cam plate and held in place by a check nut 36. Such a bolt has a plain shank portion on which is journalled a rectangular guide block 37 for registration with the longitudinal slot 38 in the longitudinal center of the link plate 39. Between the head of the trunnion screw 35 and the guide block and link plate is located a washer 40.

At the upper or outer free end of the link plate is a bolt 41 or equivalent fastening means which is located to one side of the longitudinal center of said link plate and with this bolt registers the slot 42 of the clevis 43 having threaded connection with a rod 44 for adjustability, the latter having an eye 45 at its outer end for registration with the angularly arranged trunnion 46 formed as a part of the pedal clamp 47. The eye of the rod is held in place on the trunnion 46 by means of a cotter pin 48 or its equivalent. The pedal clamp includes a body 49 having a notch 50 for registration with the shank of the pedal and a staple 51 adapted to partially surround the pedal shank with the ends of said staple passing through the body 49 and having nuts 52 threaded thereon to adjustably hold the clamp in place.

A supplementary or secondary clutch lever 53 has a split bearing 54 intermediate its ends, the parts of which are held in place by suitable fastening means such as stud bolts 55 whereby said supplementary or secondary clutch lever may be journalled upon the clutch lever shaft 21 beside the primary or ordinary clutch lever 22 and one end of said secondary clutch lever is pivoted to the link plate 39 between its points of connection with the cam plate 29 and clevis 43 by means of a bolt 56 or equivalent attaching means which is located on that side of the longitudinal center of the link plate opposite the bolt 41 so that the bolts 39, 41 and 56 are in staggered relation. The other or free end of the secondary clutch lever projects obliquely from the main portion thereof, as shown at 57, so as to overlie that portion of the main clutch lever 22 between its shaft 21 and the clutch pedal 18 and in order that the secondary clutch lever may be adjusted relative to the main clutch lever a set screw 58 is threaded through the oblique portion 57 of the secondary clutch lever for engagement with the top face of the main clutch lever. If found desirable the set screws 58 may have a check nut 59 thereon to hold the set screw in different adjusted positions.

Figure 1:
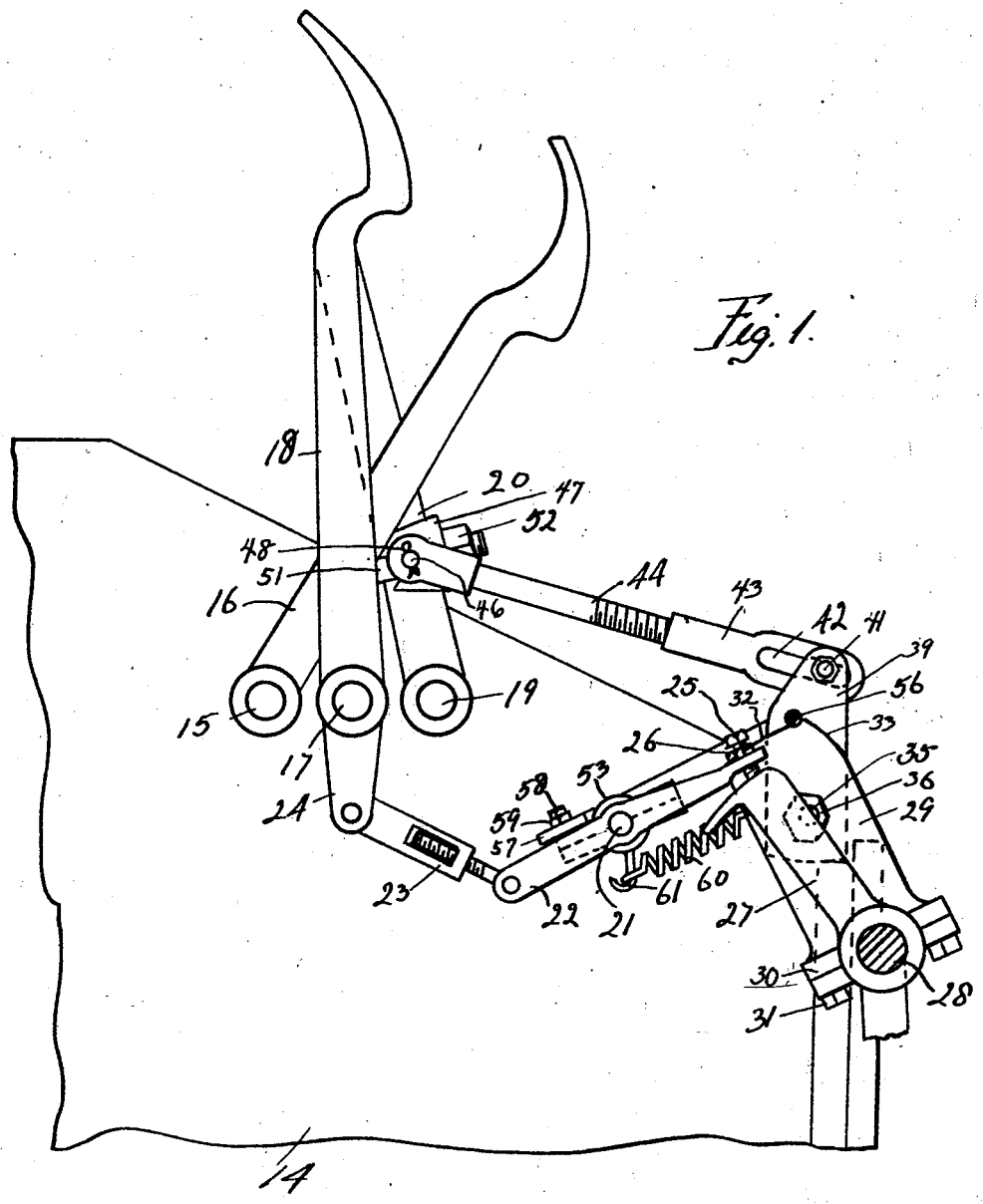
Fig. 1, is a fragmentary side elevation of an automobile transmission of the "Ford" type showing my safety clutch controller connected therewith and illustrating the parts in neutral positions with the clutch locked.
Figure 2:
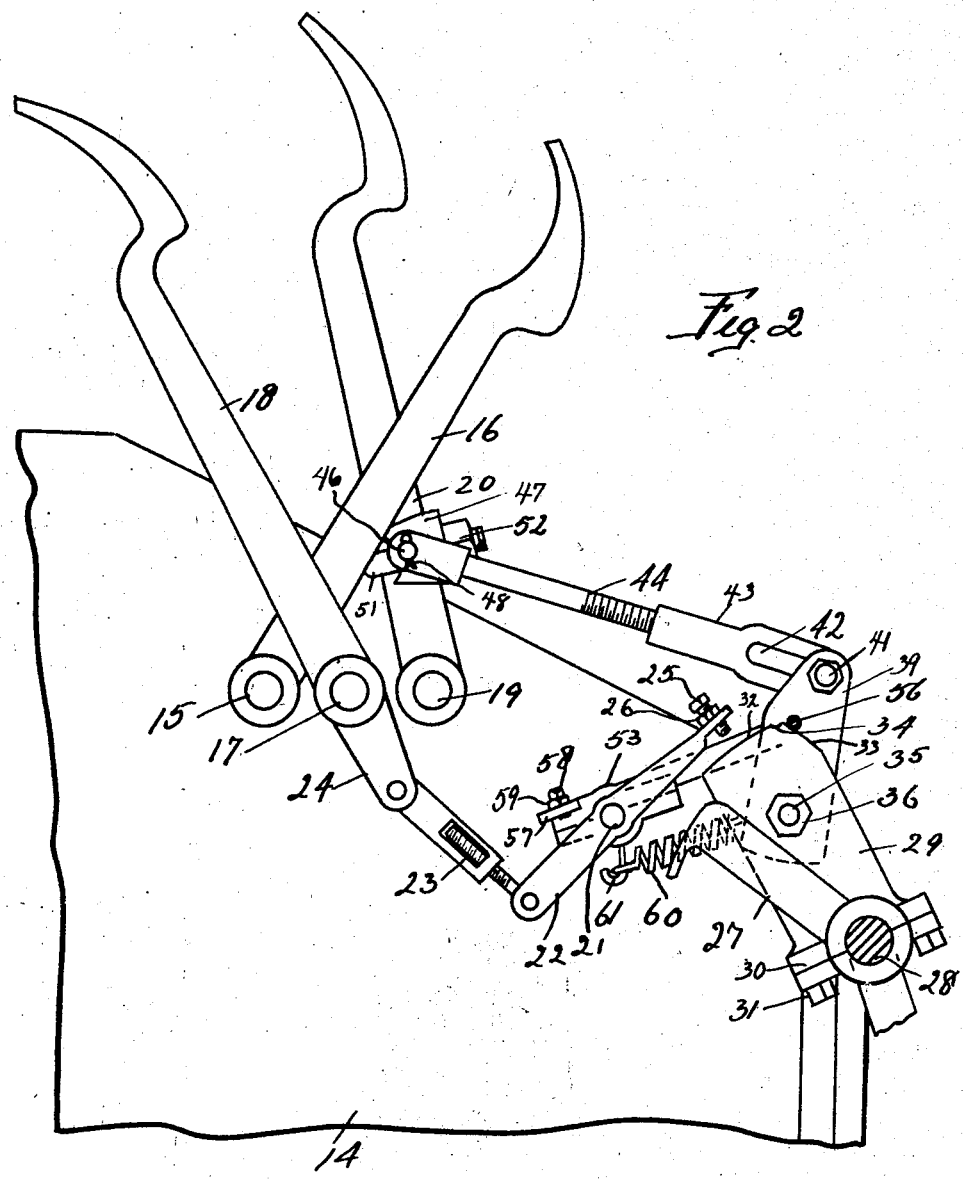
Fig. 2, is a similar view showing the clutch pedal and component parts in the low speed position.

In practice when all of the parts are in their neutral positions and the emergency brakes are applied the parts will be as in Fig. 1, which will prevent the operation of the automobile although permitting the engine to be started. After the engine has been started the control lever may be actuated so as to position the speed lever 27, as shown in Fig. 2 and release the emergency brakes. Then by moving the clutch pedal 18 forward the clutch lever 22 and its shaft 21 will be actuated and cause the transmission to be shifted from the neutral position into low speed gear and as soon as this movement has taken place the clutch lever 22 having been moved out of contact with the set screw 58 on the secondary clutch lever the latter is free to move and will therefore permit the safety clutch controller to assume the positions illustrated in Fig. 2 caused by the spring 60 one end of which is attached to the cam plate 29 and the other end to any suitable object such as a hook 61 or its equivalent carried by the secondary clutch lever.

Figure 3:
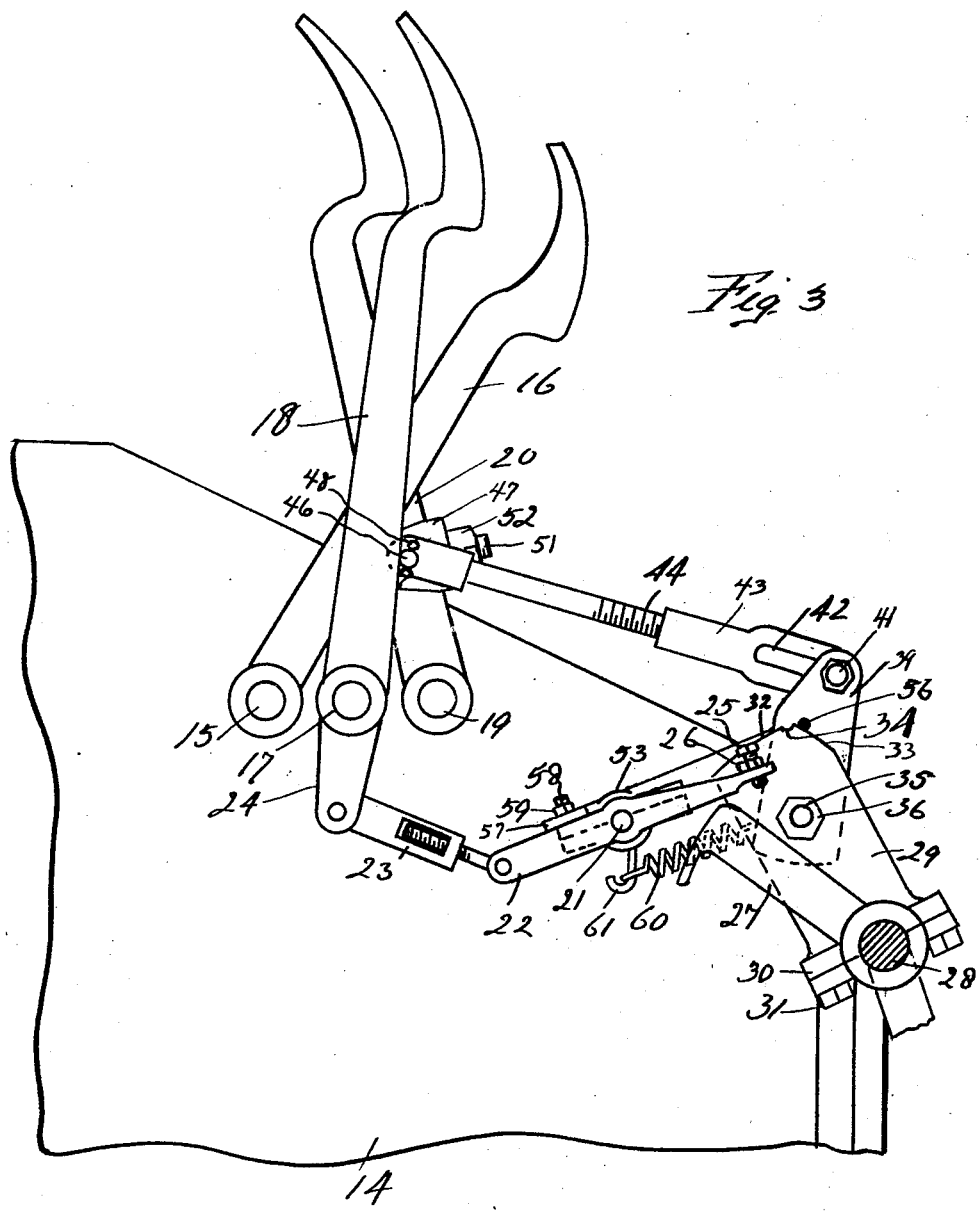
Fig. 3, is a like view showing the clutch pedal and component parts in the high speed position.

After the car has obtained sufficient momentum to shift the gears the pressure on the clutch pedal 18 is released permitting it to assume the position illustrated in Fig. 3 in the ordinary well known manner moving the clutch lever 22 into contact with the set screw 58 of the secondary or supplementary clutch lever 53. The operations so far described are the ordinary one of a "Ford" automobile but after this with my attachment connected it is unnecessary to actuate the clutch pedal during ordinary operation of the automobile and the brake may be applied without danger of the engine being stalled even though said clutch pedal is not touched.

In order to coast, that is allow the car to remain running with the clutch disengaged or in a neutral position, as when rounding corners, the brake pedal 20 is moved forward slightly causing a projecting portion of the bolt 56 to ride up over the oblique cam surface 33 on the cam plate and on to the arcuate cam surface 32 between the oblique cam surface and the notch 34 which therefore lifts or extends the link plate 39 relative to the cam plate 29 through the medium of the guide block 37 and slot 38 and this movement of the link plate will cause the secondary clutch lever 53 to be tilted because of its pivotal connection with the link plate, and through the medium of the set screw will actuate the main clutch lever 22 and shift the parts to a neutral position to disengage the clutch without actually applying the brakes. As soon as the turn has been negotiated the pressure on the brake pedal may be relieved so that it will return from the position shown in Fig. 4 to the position shown in Fig. 3. As the parts return to the positions shown in Fig. 3, the link plate 39 will retract relative to the cam plate 29 thus relieving the pressure on the secondary clutch lever from the main clutch lever so that the clutch will be again shifted into high gear.

Figure 4:
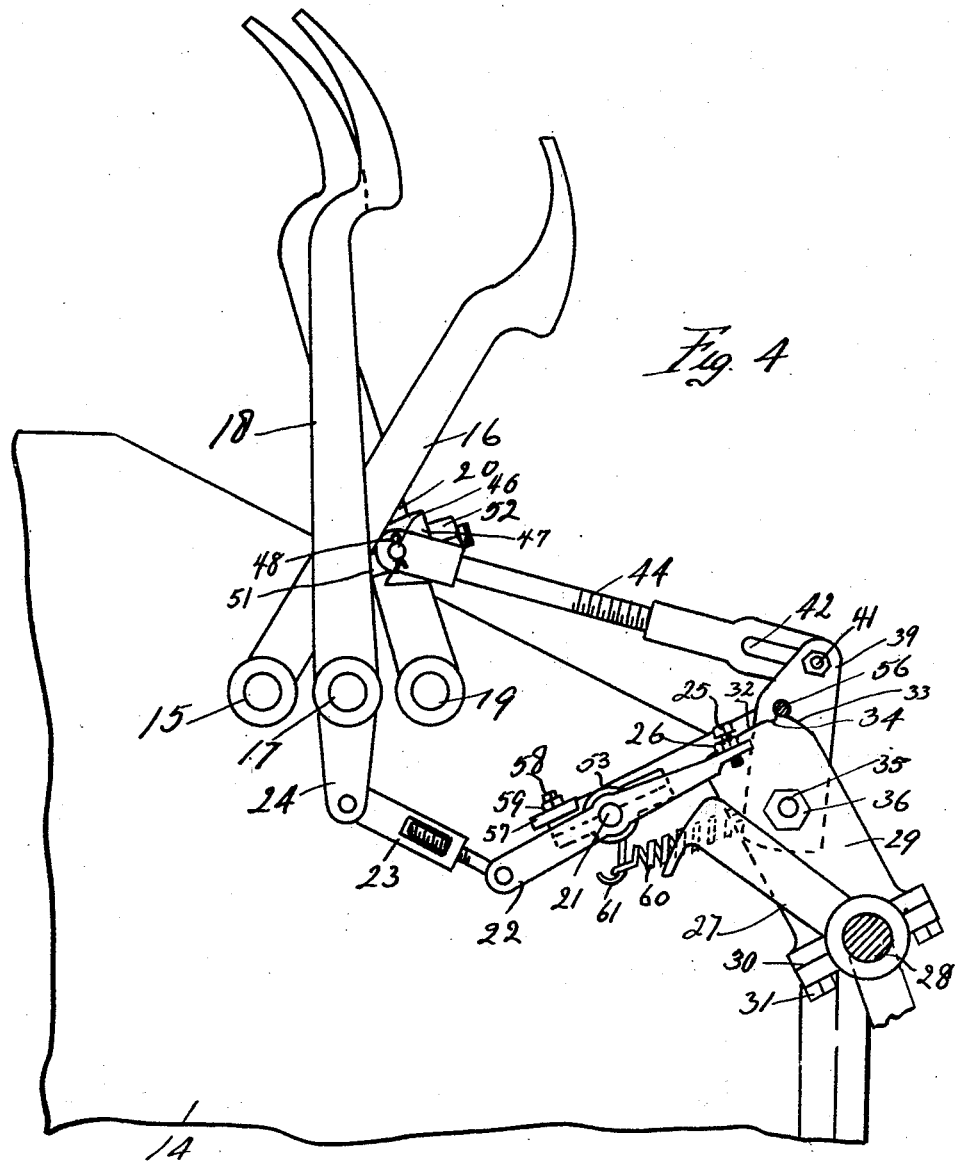
Fig. 4, is also a view similar to Fig. 1, showing the brake lever and component parts in positions to permit coasting.

When the necessity arises from the application of the brake the brake pedal 20 is firmly forced forward for its entire movement, as shown in Fig. 5, and this movement of the brake pedal will cause the link plate 39 to be raised or extended relative to the cam plate the same as described with reference to Fig. 4, causing the clutch to be disengaged or moved to a neutral position and therefore allow the engine to run free. The disengagement of the clutch by the actuation of the brake pedal only overcomes the disadvantage of having to first actuate the clutch pedal with one foot to release the clutch and then actuate the brake pedal with the other foot which mode of operation is often forgotten or disregarded during the excitement attendant a sudden danger. At such time the operator of an automobile often quickly applies the brake and if the clutch is not disengaged the engine will be stalled or stopped, thus preventing further operation of the automobile either forward or rearward which if possible might relieve another danger arising from the sudden stopping of the automobile.

The application of the brake, as shown in Fig. 5, having disengaged the clutch as soon as the pressure on the brake pedal is released the parts will return to the positions shown in Fig. 1, with the exception of the speed lever 27 which will remain in its inoperative position, shown in Figs. 2 to 5 inclusive. It is to be particularly noted that when the parts are in the positions shown in Fig. 1, the extended portion of the body 56 is resting in the notch 34 thus preventing the parts from moving of their own accord due to the spring actuated elements of the transmission mechanism. This being the case the transmission may now be thrown into the reverse gear by simply pressing upon the reverse pedal 16 or it may be thrown into the low gear by actuating the clutch pedal 18 in the ordinary manner.

From the foregoing it will be seen that after the automobile has been started in the ordinary and well known manner the operation thereof may be controlled by the single brake pedal unless compelled to come to a stop or reduce the speed below that which could be readily picked up on high gear. Further it is to be particularly noted that the brake may be applied and the car body brought to a stand still without the necessity of using the clutch pedal to disengage the clutch and without the necessity of utilizing the control mechanism to position the speed lever 27 beneath the free end of the main clutch lever 22 when the car is brought to a stand still without stopping the engine, thus permitting the operator to immediately reverse or proceed at low speed without removing a hand from the steering wheel and without the possibility of stalling the engine.

By the use of such an attachment the operation of automobiles of the "Ford" type will be greatly simplified and the likelihood of accidents considerably reduced.

Of course I do not wish to be limited to the exact details of construction as herein shown as these may be varied within the limits of the appended claims without departing from the spirit of my invention.

Having thus fully described my invention, what I claim as new and useful is:—

1. In a device of the character stated, the combination with a brake pedal and a transmission including a clutch lever fixed thereon, a clutch pedal, means for connecting said clutch pedal with the clutch lever, a controller shaft and its speed lever, of means mounted upon the controller shaft and connected with the brake pedal and coacting with the clutch lever to actuate said clutch lever upon operation of the brake pedal while permitting said clutch lever to be actuated by the clutch pedal independent of said means.

2. In a device of the character stated, the combination with a brake pedal and a transmission including a clutch lever fixed thereon, a clutch pedal, means for connecting said clutch pedal with the clutch lever, a controller shaft and its speed lever, of a cam plate loosely journalled upon the controller shaft, a link plate rotatably and slidably connected with the cam plate and having means to follow the cam surfaces of said cam plate, means pivoted to the link plate and journalled on the clutch lever shaft for coaction with the clutch lever, and means for transmitting motion from the brake pedal to the link plate.

3. In a device of the character stated, the combination with a brake pedal and a transmission including a clutch lever fixed thereon, a clutch pedal, means for connecting said clutch pedal with the clutch lever, a controller shaft and its speed lever, of a cam plate loosely journalled upon the controller shaft, a link plate rotatably and slidably connected with the cam plate and having means to follow the cam surfaces, a secondary clutch lever journalled on the clutch lever shaft and having one end pivoted to the link plate the opposite end of said secondary clutch lever being disposed across a portion of the main clutch lever, means for adjusting the secondary clutch lever relative to the other, and adjustable means for loosely connecting the link plate and brake pedal whereby motion may be transmitted from the brake pedal to said link plate.

4. A safety clutch controller for automobiles comprising in combination, a cam plate having an arcuate cam surface at the outer free end and an oblique cam surface running from one end of the arcuate cam surface, said cam plate having a notch in the end adjacent the oblique cam surface, a rectangular guide block rotatably mounted on the cam plate, a link plate having an elongated slot for coaction with the guide block to permit of a sliding and rotary motion of the link plate relative to the cam plate, fastening means carried by the link plate and having an extended portion for cooperation with the cam surfaces of the cam plate, a secondary clutch lever having one end pivoted to the link plate by said fastening means and adapted to be journalled intermediate its ends and a connecting member slidably and rotatably attached to the link plate and adapted for connection with a brake operating mechanism.

In testimony whereof, I have hereunto affixed my signature.

OTTO KUGLER, Sr.